United States Patent [19]

Anderson et al.

[11] Patent Number: 4,748,355

[45] Date of Patent: May 31, 1988

[54] ELECTRICAL CONNECTOR WITH A RELEASABLE LOAD-CONTROL ELEMENT FOR MULTI-CONNECTABLE LOADS

[75] Inventors: Wesley K. Anderson, Schofield; Daniel J. Edminster, Grafton, both of Wis.

[73] Assignee: Marathon Electric Manufacturing Corp., Wausau, Wis.

[21] Appl. No.: 804,154

[22] Filed: Dec. 3, 1985

[51] Int. Cl.$^4$ .................. H02K 11/00; H01K 29/00
[52] U.S. Cl. ........................................ 310/71; 439/516
[58] Field of Search ............ 310/71; 339/31 M, 32 M, 339/32 R, 33; 439/217, 516

[56] References Cited

U.S. PATENT DOCUMENTS

| | | | |
|---|---|---|---|
| 2,922,054 | 1/1960 | Miller | 310/71 |
| 3,231,767 | 1/1966 | Powell | 310/71 |
| 3,453,403 | 7/1969 | Hoffman | 310/71 |
| 3,477,001 | 11/1969 | Spinrad et al. | 310/71 |
| 3,518,616 | 6/1970 | Lewis | 310/71 |
| 3,602,748 | 8/1971 | Locke | 310/71 |
| 4,178,523 | 12/1979 | Lyerly | 310/71 |
| 4,211,962 | 7/1980 | Grünleitner et al. | 310/71 |
| 4,429,935 | 2/1984 | Lamb et al. | 339/32 M |
| 4,547,689 | 10/1985 | Tsuchimoto et al. | 310/71 |

Primary Examiner—Patrick R. Salce
Assistant Examiner—D. L. Rebsch
Attorney, Agent, or Firm—Andrus, Sceales, Starke & Sawall

[57] ABSTRACT

A universal motor connector unit is usable with different three phase and single phase motors for connecting the motors to different incoming voltages. The connector has a motor-mounted connector unit with 15 socket terminals and contacts in a fixed 3×5 matrix array. A complementing plug-in connector unit has pin contacts in a similar matrix and with U-shaped connections between the pin contacts. In a three phase connector, 12 pin contacts are in a 3×4 matrix. The plug-in unit in one orientation establishes a first winding connection for one voltage and when rotated 180°, a second voltage. The connector may also be used to change direction of rotation rather than voltage selection. For a single phase motor, the socket connector is the same as for the three phase motor. The plug-in unit is formed with separate plug-in elements; one is provided for voltage selection and a second for rotation selection. The various parts can be specially encoded to prevent insertion of the voltage selection unit into the rotational selection part and/or insertion of the rotational selection part to the voltage selection terminals of the socket member.

20 Claims, 4 Drawing Sheets

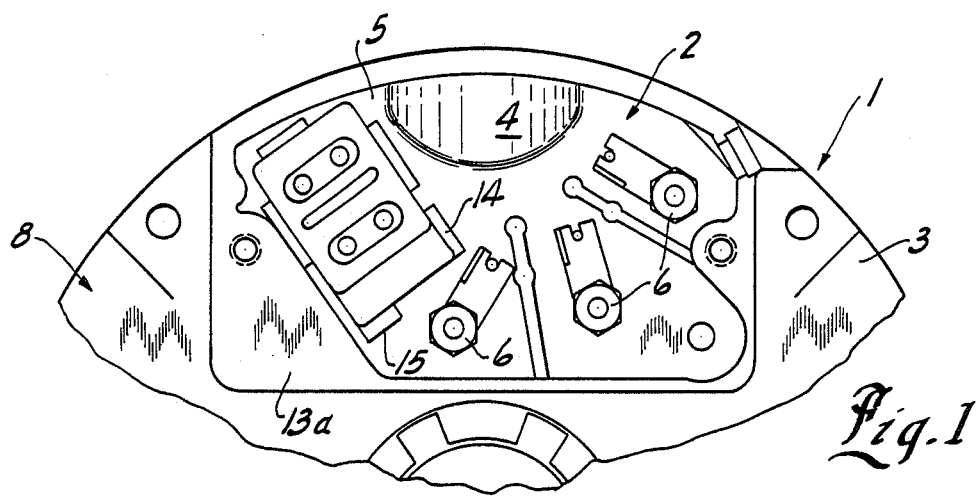
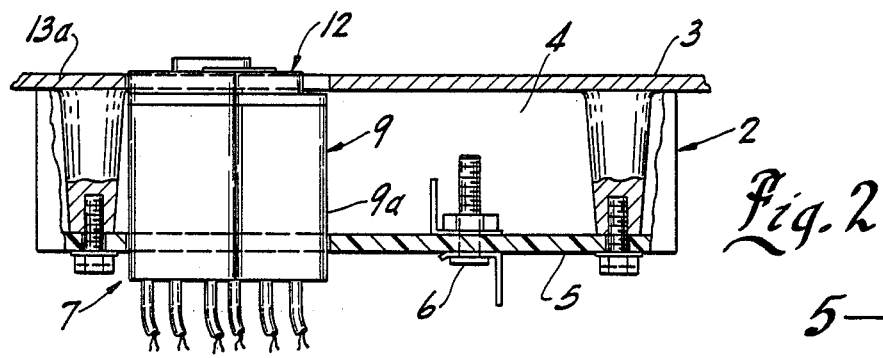
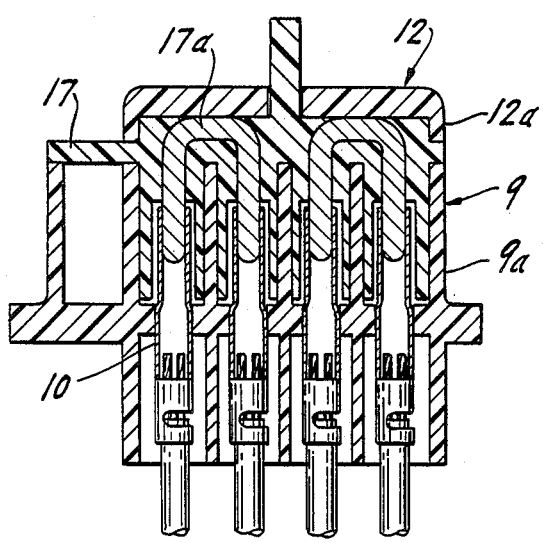
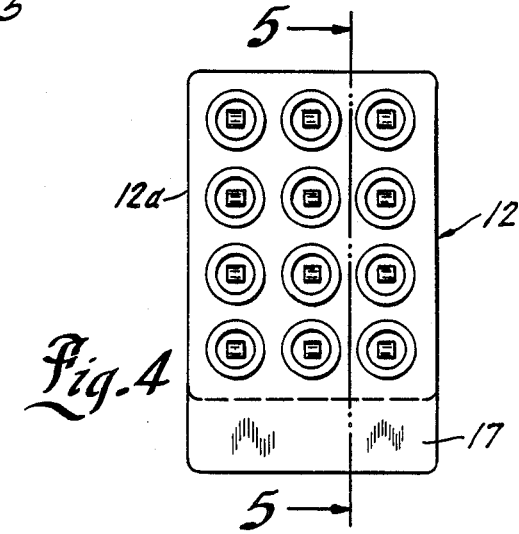
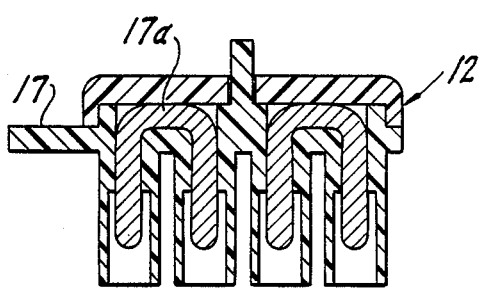

ELECTRICAL CONNECTOR WITH A RELEASABLE LOAD-CONTROL ELEMENT FOR MULTI-CONNECTABLE LOADS

BACKGROUND OF THE PRESENT INVENTION

This invention relates to a multiple voltage motor control and in particular to a single releasable connector unit for selectively energizing a motor for either of two operating voltages.

Alternating current motors are widely used as power drives for operating other mechanisms. Alternating current motors are specially constructed to operate at different voltages in accordance with the power supply voltages available in the conventional power distribution systems and the like. Conventionally, single phase motors will be operated at 115 volts or 230 volts, while three phase motors will be operating at 230 or 460 volts, depending upon the particular application, the availability of such voltages, and the like. Any given motor by proper design can be constructed as a dual voltage motor which can be operated at either one of the two basic power supplies by providing proper circuit connection between the power supply and the several motor windings. Additionally, single phase motors can reverse the direction of rotation by reversing of the winding connection to the power supply. More particularly, AC motor windings are conventionally formed with multiple coils. The individual coils are connected in different circuit configurations to accommodate the different voltages. The end terminals for the coils and the power supply terminals may of course be terminated in an accessible part of the motor. The user can then properly interconnect the several coils to each other and to the incoming power supply lines for a particular voltage and/or rotation. The individual connection is of course not only time consuming, but the result is highly dependent upon the skill and attention of the service person making the appropriate connection. In order to avoid the costly time associated with personnel-dependent connection of the motor windings, as well as the effect of human error, various switching and plug-in type connector units have been developed to permit simple user selection of the appropriate winding connections. In such system, a pin and socket connector unit may be provided. The motor mounted part includes internal connection of the coil ends and the power supply lines to a multiple socket unit. A selection plug is then provided with a similar array of connected prongs or pins for insertion into the socket unit which creates a connection of the winding ends to each other and to the line terminals for appropriate voltage selection. For example, U.S. Pat. No. 3,602,748 discloses a typical plug-in unit for voltage selection. The coil ends or terminations are connected to a terminal unit mounted within the motor. The terminal unit includes an individual terminal pin units for each coil end or interconnected ends. A shorting socket unit is provided having mating complementing terminal sockets. The socket unit can be inserted in alternate orientations, each of which is related to a particular voltage. Connectors of the socket and shorting plug type may also be constructed and arranged to provide reversal of the rotational output of the motor. The motor winding connections internally and to the power supply lines may not only determine the voltage but the direction of rotation of the rotor, and therefore the motor output. Thus, generally by reversing of the power supply lines connection in a single phase motor, the direction of rotation of the motor can be reversed. U.S. Pat. No. 4,211,962 which issued July 8, 1980, for example discloses a special D.C. brushless reversibly motor having a connector unit of a socket and jack type connected respectively to the motor and to a supply and commutating circuit. The contacts of the respective socket and jack are similarly arrayed such that 180° rotation of the plug results in reversing rotational direction of the motor.

U.S. Pat. No. 3,602,748 which issued Aug. 31, 1971, discloses another typical plug-in connector for a three-phase dual-voltage motor. The jack or cap member is shown coupled to the power supply lined and the plug is connected to the motor windings. A separate cap member is provided for each voltage and includes appropriate internal jumper leads for connecting of the proper winding terminals to each other and to the desired voltage.

U.S. Pat. No. 2,922,054 which issued Jan. 19, 1960, discloses a motor having a socket unit mounted to the motor as an integrated assembly with a shorting plug adapted to be inserted into the socket unit to control the winding connection. Thus, appropriate labels may be provided. Alernatively, multiple socket elements may be provided to receive a voltage socket, such as shown in applicant's patent application Ser. No. 06/428,997 which was filed on Sept. 30, 1982 entitled "Multiple Voltage Motor Connection Apparatus" by the inventor Wesley Anderson now abandoned. In the above entitled application, a separate socket unit is provided for each voltage. A single plug-in unit is provided for selective insertion into the two sockets for selection of the two different voltages.

Other similar plug-in type units are shown for example in the following issued patents. Generally, all such patents disclose plug-in type units particularly the tailor design tailored to a particular motor construction.

Typically, in the prior art voltage selection systems, each type of motor is provided with a separate and uniquely related and custom designed voltage selection system. Thus, a socket and plug-in unit is specially constructed for each given motor design. Other motors have individual custom designed plug-in connector units. However, complete separate design for various motors adds to the cost of the individual motors. Although the given cost increase for any given motor may be economically justified, there is of course a continuing demand in the field, particularly for high production motors, to minimize such costs and thereby contribute to the more economic and efficient production of motors.

The plug-in connector must of course permit convenient packaging in or to the motor, while providing readily understood and accessible manipulation of the motor connection for field installation of the power supply and selection of the proper motor connection for the incoming power supply. The various motors may or may not require use of a thermal overload protector. Where used, the protector is conventionally mounted within the motor and hardwired directly to the winding circuit. This is not accomplished in the field if the protection is in the motor. External overloads may be applied, however, in the supply system.

The inventor's analysis of the prior commercial art has indicated the need and demand from the purchasers for a simplified but reliable and economic multiple contact releasable connector which can be universally applied to a line of multiple voltage motors including both single phase motors and polyphase motors.

SUMMARY OF THE PRESENT INVENTION

The present invention is particularly directed to a universal motor voltage selection connector unit of a releasable and preferably plug-in type construction having complementing circuit connecting members, one of which is made an integrated part of the motor, and the other of which is selectively connected to the motor mounted part for motor voltage and/or rotation selection. The connector unit is specially constructed for universal application to a plurality of motors, and in a preferred embodiment is constructed and arranged such that a basic connector unit can be mounted in a three phase motor to provide for voltage selection of three polyphase motor and the same embodiment can also be mounted in a single phase motor to provide for appropriate voltage and rotation selection for single phase motors. Generally, in accordance with the present invention, a motor mounted unit is provided having at least 15 terminals and contacts in a fixed array in a motor mounted connector part for interconnection to the motor coils of a motor. The terminal array is preferably a 3×5 matrix. In addition, incoming power line connection means are provided either as a separate terminal assembly or as an integrated part of the motor. A complementing movable connector part is provided having selected terminals and contacts interconnected by internal shorting means arranged and constructed in accordance with its application to a three phase motor or a single phase motor. The complementing movable part for the three phase motor includes at least 12 complementing terminals, adapted to interengage and mate with 12 different terminals of the motor mounted part, depending upon the orientation of the movable part and the motor mounted part. The movable part includes proper internal shorting connection for selective connection of terminals of the motor mounted part for appropriate connection of the windings to each other and to the incoming power lines, with the orientation of the movable part establishing different winding connections as dictated by the incoming power supply, or the desired direction of rotation.

In a preferred construction, the motor part is a socket member having an array of sockets, while the movable part in a releasable plug having projecting terminal pins adapted to mate with the sockets in two different orientations, and provide different circuit connection through the aligned sockets. The following description herein will describe the motor connector with the socket and pin type construction for simplicity and clarity of describing the invention.

The personnel operating the motor merely selects the proper phase voltage line connection, which is dictated by the incoming supply and the appropriate insertion of the movable part to the integrated motor part.

The same terminal connector part can be used for a single phase motor, with a first group of the terminals assigned to the voltage selection and with a second set of terminals assigned to rotational direction selection. In a single phase assembly, a voltage plug is provided for voltage selection and a separate rotational plug is provided for rotation selection. The various parts can of course be specially encoded to prevent insertion of the voltage selection unit into the rotational selection part and/or insertion of the rotational selection part to the voltage selection terminals of the socket member.

More particularly, in a polyphase motor including the overload at least 12 of the sockets are interconnected to the windings and power terminals for separate interconnection to each other. The plug-in unit includes a corresponding 12 of the 15 terminal pins connected in shorted pairs for interconnection of the several coils, and the overload unit where used, to each other and to the appropriate polyphase input power supply. For a motor without thermal overload, the socket terminals otherwise connected to the thermal overload may be shorted for interconnecting of the three related thermal motor winding terminations to define the circuit common connection. The plug-in unit is appropriately constructed using the 12 terminals appropriately arranged for interconnecting to the 15 terminal sockets.

In a preferred construction, the integrated motor socket is formed as a 3×5 matrix. The plug-in unit is formed as a 3×5 matrix, having the connection within a 3×4 matrix therein. For a given voltage connection, the plug is introduced to the socket with the 3×4 matrix of the plug mating with a 3×4 matrix portion of the 3×5 matrix, and thus with an outer row of one matrix adjacent the corresponding outer row of the other. To reverse the voltage selection, the plug-in unit is rotated 180° to orient the plug-in unit with the opposite three end rows of the 3×5 matrix.

In a single phase motor application, the same socket member is integrated into the motor. The first column of the 3×5 matrix is used for motor voltage selection. The last or oppositely spaced column of the 3×5 matrix is provided for rotation selection. The voltage selection for the single phase motor is formed as an 1×5 matrix adapted to be correspondingly placed in either of the 180° orientation into the corresponding portion of the integrated motor socket. The rotational part is similarly constructed as a 1×5 matrix for interengagement and insertion to the rotational selection portion of the motor integrated part and thereof 180° orientation. The single phase motor part may be provided with special interlocking means to prevent the erroneous insertion of the movable parts into the motor mounted part.

The present invention thus provides a basic universal connector construction for integration into a line of motors including both polyphase motors and single phase motors. The connector minimizes the probability of an erroneous motor connection. The universality of the connector part significantly contributes to the reduction in manufacturing cost, thereby contributing to the economic production of low cost motors.

BRIEF DESCRIPTION OF THE DRAWINGS

The drawings furnished herewith generally illustrate the best mode presently contemplated for the invention and are described hereinafter.

In the drawings:

FIG. 1 is a view of one end of an alternating current motor including an internal motor connector assembly constructed in accordance with the teaching of the present invention;

FIG. 2 is a side elevational view of the motor connector assembly shown in FIG. 1 and taken generally on line 2—2 of FIG. 1;

FIG. 3 is an enlarged cross-section through the voltage selection connector unit shown in FIGS. 1-2;

FIG. 4 is an enlarged end view of the plug in unit with a socket unit removed;

FIG. 5 is an section view of the terminal plug connector shown in FIGS. 1 and 2 and taken on line 5—5 of FIG. 4;

DESCRIPTION OF ILLUSTRATED EMBODIMENT

Figure 5A:
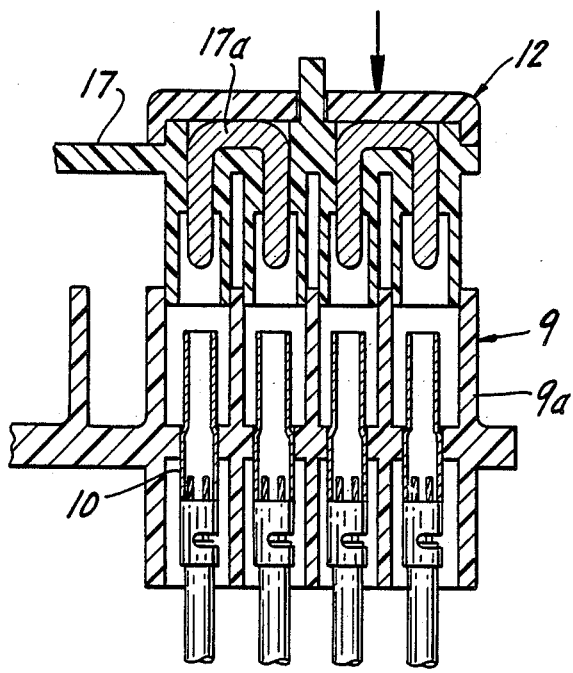
FIG. 5A is a view similar to FIG. 3 with the parts separated and in position for connection.

Referring to the drawing and particularly to FIGS. 1 and 2, an alternating current motor 1 is illustrated having a power supply connector assembly 2 located within the end bell 3 of the motor 1. The connector assembly 2 is housed within a chamber 4 defined by the end bell 3 and includes an insulating terminal or support board 5 secured within the chamber. The illustrated motor is shown as a three phase motor and three power supply terminals 6 are illustrated for interconnection to the incoming three phase lines. The motor is adapted to operate at either of two voltages. For example, the motor may be constructed to operate at 208-230 volts or 460 volts. Such motors are widely used in industry. However, it is critical that the motor windings be appropriately connected for the selected operating voltage to prevent destruction of the motor. A special power supply and winding connector unit 7 is secured to board 5 within the chamber 4 for elective connecting of motor windings 8 to each other and to the incoming power terminals 6 in accordance with the selected voltage of the incoming power supply. Generally, the winding connector unit 7 includes a motor part 9 attached to the board 5, and as more clearly shown in FIG. 3. The motor part 9 particularly includes a block-like insulating housing 9a which may be integrally molded with the board 5 as shown in FIGS. 2 and 3, or releasably secured within an opening in the board. A plurality of socket contacts 10, shown as outwardly opening sockets, are housed within the insulating block and interconnected to the several windings 8 and to the power line terminals 6 for connection to incoming power line 11. A movable selector part 12 is releasably secured to the motor part 9. The movable part 12 includes complementing contacts 13 within an insulating block 12a. The movable part 12, and particularly the set of contacts 13 is constructed and arranged to permit the interconnection between the several contacts 10 and 13 by selective orientation of the block 12a relative to block 9a. When the part 12a is inserted into the motor part 9a in one orientation, preselected contacts 10 of the motor part 9 are interconnected to each other by the contacts 13. This results in the interconnection of the motor windings 8 to each other and to the incoming power supply terminals 6 in a circuit connection for one voltage. A second and different orientation connects the windings 8 for the second rated voltage.

In use, the tightening of a cover 13a preferably forces the plug unit 12 into the socket unit 9 to insure full and complete circuit interconnection between the several contact sockets and pins.

Figure 6:
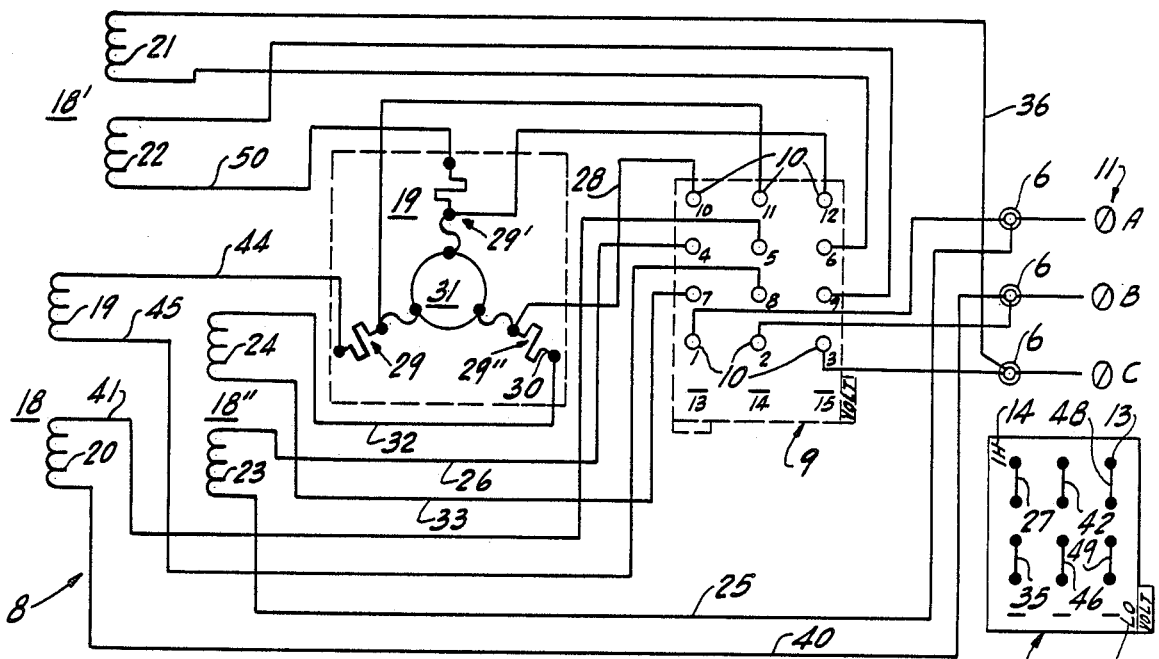
FIG. 6 is a schematic circuit illustration showing a three phase motor circuit having a high voltage circuit connection with a thermal overload protector establised by the motor connector shown in FIGS. 1-5.
Figure 7:
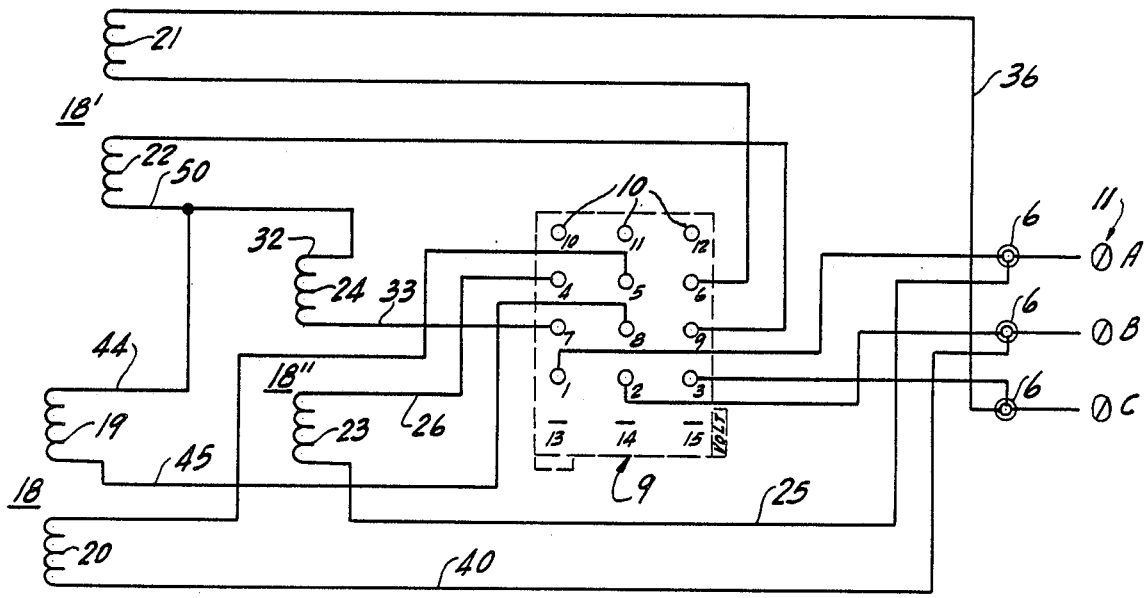
FIG. 7 is the circuit of FIG. 6 with the thermal overload protector removed and with a low voltage circuit connection.

As more clearly shown in FIGS. 1, 6 and 7, the motor part 9 is specially constructed with a visual voltage key 14 shown as a labeled projection 14 from the one edge of the block 9a. A rotation key 15 is similarly secured projecting from the adjacent edge of the block 9a. The keys 14-15 are appropriately identified as by color coding, the abbreviation of "volt" and "rot" on the respective projections or the like.

The movable part 12a is shown as a smaller block-like member. The appropriate voltage selection is made by 180° rotation of the movable part block 12a when insertion into or connection to the motor part 9a. The movable part 12a is identified with the proper voltage legend as by high and low voltage indicia applied to the opposite diagonal corners of the block 12a. Thus in the one location the terminology "low", for example, will be aligned with the voltage key 14. One hundred and eighty degree location will locate the word "high" with the volt key 14.

In addition, the high voltage end may be uniquely identified, such as shown for example by a structure more clearly in FIG. 3-5. In the illustrated construction, the low voltage end is formed with an offset portion 16 to define a low ledge 17 set significantly inwardly of the high voltage end. The level then further indicates the appropriate voltage being selected.

The present invention is directed to the winding connector assembly 2 and particularly to connector unit 7 constructed as a universal type winding connector unit which can be applied to a complete range of dual voltage and/or dual rotational motors.

The motor may be of any desired alternating current construction having the winding 8 wound and selected to permit interconnection for either of the two voltages. Similarly where desired, and more fully developed hereinafter, the windings may be selected and wound for reverse rotational operation. As such motors and motor windings are well known, no further description thereof is given herein other than as necessary to fully explain the illustrated embodiments of the winding connector. Various embodiments of the winding connector are presently described and set forth the various unique features and advantages of the universal connector of the present invention.

Generally, in accordance with the teaching of the present invention, the motor mounted part 9 is formed with fifteen available contact locations 10 adapted to be connected to the motor windings 8. The fifteen contact locations including contact sockets 10 provide all of the contacts necessary for interconnection of both single phase motors or three phase motors for the standard operating voltages and dual rotation constructions. As discussed hereinafter, certain locations may not have contact elements, but are then used in one orientation to accommodate a contact element of the complementing part. The movable part 12 of course has fifteen complementing available contact locations, some of which have adjacent paired contacts 13 shown as pin connected to form bridging contacts for interconnection of the contacts 10 in the contact locations of the motor part 9. The motor and the movable part 9 and 12 are formed for releasable interconnection and in the connection position provide for appropriate connection of the several terminals or contacts in available contact locations 10 of the motor part.

In a practical and preferred construction as illustrated in the drawing, the motor part is formed with 15 contact sockets 10, each of which has a connecting terminal 5 portion projecting from the backside of the insulating block 9a and of the support board 5. The terminal portions are connected to the winding 8 and to the terminals 6 by suitable leads as hereinafter described. The plug unit 9 has individual contact pins 13 which are paired and interconnected by integral shorting members 17a to form U-shaped contacts interconnecting selected ones of the complementing terminal sockets of the motor part 9. The movable part 12 is formed with the fifteen terminal pin locations within which the selected U-shaped contact 13 are secured in a 3×4 matrix.

The movable part 12 may be made of a two piece construction, including a base member having the 3×4 matrix of terminal contacts 13 embedded therein and projecting therefrom. The shorting contacts are generally U-shaped and located to span and align with two adjacent terminal pins in a given column, as more fuly developed as hereinafter. An outer block member 12a is affixed to the base member to form a single integrated plug-in unit. When assembled, the movable part 12 thus defines the shorting circuit unit for interconnecting of predetermined contacts 10 within the 15 socket matrix of the motor mounted part.

Figure 8:
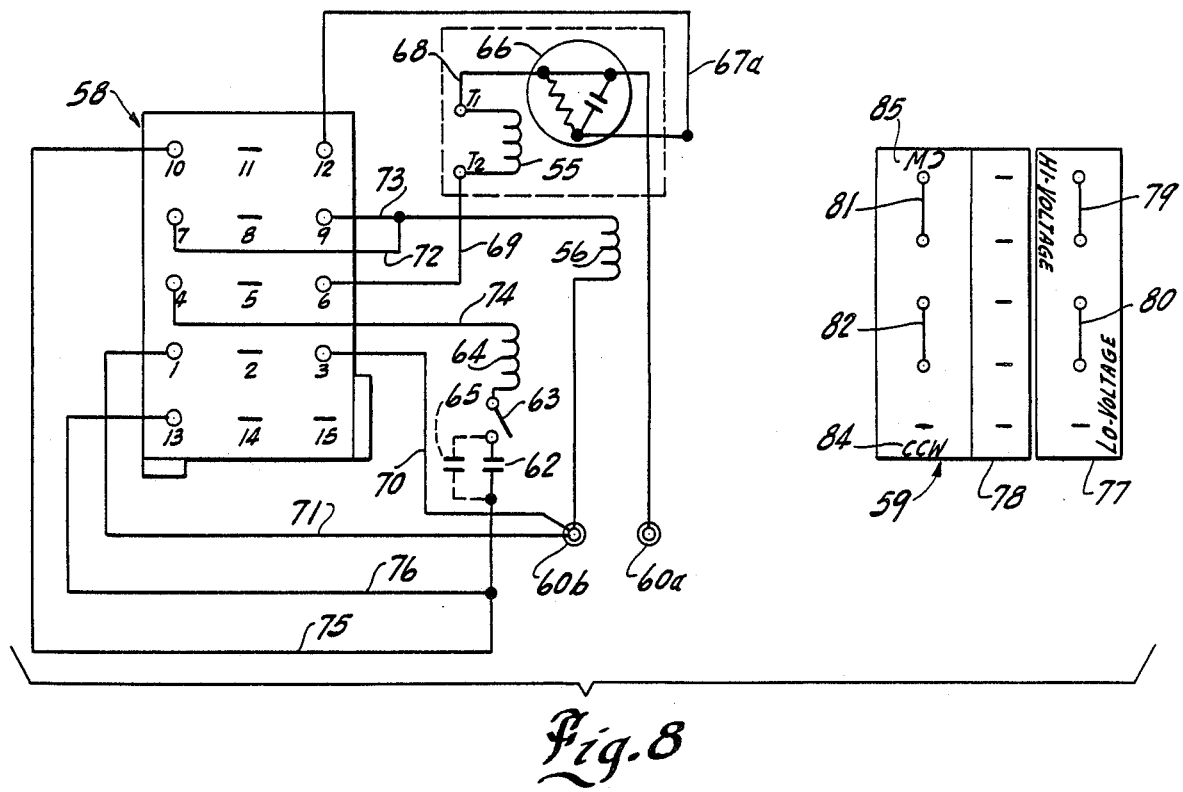
FIG. 8 is a schematic circuit diagram of single phase motor including a connector constructed in accordance with the present invention.

The 15 contact locations in the parts 9 and 12 are arranged in the same 3×5 matrix. The matrix pin assembly as previously noted permits connection of various motors in the desired winding arrangement and permits construction of a single winding connector assembly with appropriate movable parts for establishing particular winding connections, such as shown in FIGS. 6–8.

Referring particularly to FIG. 6, a three phase motor circuit is schematically shown with a thermal overload connected into the circuit and connected to incoming power lines through the connector assembly 2, as shown in FIGS. 1–5. The assembly is shown diagrammatically with the movable part 12 separated from the motor mounted part, for simplicity and clarity of description.

More particularly, the illustrated motor circuit is shown with a winding 8 consisting of three dual coil windings 18, 18' and 18". A thermal overload unit 19 of a known construction is provided, having three phase line terminals for interconnection into the circuit with the windings 18 through 18' inclusive, and the incoming power supply terminals 6. The interconnection of the winding 8 and the thermal overload unit 19 is made through the connector assembly 2 of the present invention as shown and described as follows.

Winding 18 includes coils 19 and 20, winding 18' includes coils 21 and 22 and winding 18" includes coils 23 and 24.

Interconnection of the windings 8 is determined by the movable plug-in part 12 of the connector unit 7. As shown in FIG. 3, for both the low and the high voltage connections, a 3×4 matrix of the contacts 13 is used, consisting of the six U-shaped contacts formed by the illustrated jumper connection of the pin contacts 13. Thus, one end row of the three contact pin locations is blank. The other four rows have the contacts 13 in each of the three columns, connected as shown.

For the low voltage connection, the movable part 12 is converted with the blank row aligned with the socket row including the number 13, 14 and 15 contact sockets 10. The U-shaped pin contacts 13 are connected, respectively, identified by contacts numbers 1 and 7, 2 and 8, 3 and 9, 4 and 10, 5 and 11, and 6 and 12. The result is the following interconnection of the winding.

The three incoming line terminals are connected directly to the number 1, 2 and 3 sockets of the motor mounted connector part 12, the number 1 line terminal 6 is also connected via a termination lead 25 to the one side of coil 23 of winding 18". The opposite side of the coil 23 is connected by a lead 26 to the number 4 socket 10. The U-shaped shorting contact 27 connects the number 4 socket to the number 10 socket which in turn is connected by a lead 28 to the thermal overload protector 19.

The protector 26 is a standard well known device having the phase inputs, 29, 29' and 29" for the corresponding windings 18, 18' and 18", each of which includes a sensing resistor 30 defining a pair of terminals for connection in series with a related phase and to a fused motor common 31. Resistor 30 connects the input 29" and thus the protector 19 to the number 10 socket of the connector unit 7. The opposite side of resistor 30 is connected by a lead 32 to the coil 24 of winding 18". The opposite side of coil 24 is connected back to the number 7 socket 10 which is connected to the number 1 socket 10 by a U-shaped jumper contact 25 of the plug 12. The number 1 socket 10 is connected directly to the first phase terminal 6 via a connecting lead 36. The bottom side of coil 23 and the top side of coil 24 are both connected to the same line terminal 6, while the top side of coil 23 and the bottom side of coil 24 are both connected to the protector input 29". The coils 23 and 24 of the winding 18" are thereby connected in parallel with each other between the incoming phase terminal 6 and the one protector input 29", which forms a common connection with other similarly connected windings 18 and 18'. The one phase winding 18" is connected in circuit with the coils in parallel, as required for the voltage motor operation.

Referring particularly to phase winding 18, it is similarly connected between the second terminal 6 and the protector input 29. The one side of coil 20 is connected directly via the lead 40 to the supply line terminal 6. The opposite side of the coil 20 is connected via the lead 41 to the number 5 socket 10 of the connector unit 7, which in turn is connected by the U-shaped shorting contact 42 to the number 11 socket 10. A lead 43 connects the number 11 socket to the second input 29' of the thermal overload unit 19. The coupling resistor 30' within the overload unit 26 connects to a lead 44 and to one side of the second coil 19 of winding 18. The opposite side of the second coil 19 is connected via the lead 45 to the number 8 socket 10 of the connector unit 7. A shorting unit 46 connects the number 8 socket to the number 2 socket 10 which is connected via lead 47 to line terminal 6 for the second phase line 11. This just described circuit connects the coils 19-20 of winding 18 in parallel with each other between the line terminal 6 and the common start connection defined by the thermal overload unit 19.

Winding 18', and particularly coils 21 and 22, are similarly connected in parallel between the third line terminal 6 and the third input 29' of the thermal overload unit 19 by the jumper U-shaped contacts 48 and 49 of the plug 12, and the common lead 50 to the thermal protector. The motor 1 is thereby connected with the paired coils of each phase winding 18, 18' and 18" connected in parallel with each other to the corresponding line phase.

If the motor is constructed without the overload unit 19, the same low voltage plug 12 is used. The motor windings 8 and particularly the coil units of phase windings 18, 18' and 18" are then connected as shown in FIG. 7.

As shown in FIG. 7, the only changes required when removing the thermal protector 19 is the removal of the three connecting leads 32, 44 and 50 from number 10, 11 and 12 sockets to the thermal protector 19 and the direct interconnection. All other connections are the same. In the motor circuit connection without the thermal protection, the number 13, 14 and 15 terminals remain blank. The number 10, 11 and 12 sockets remain, but no connection is made thereto.

When the movable connector plug 12 is inserted into the socket part 9 for the low voltage connection, the several windings 18, 18' and 18" are each again connected in parallel between the common connection and of leads 32, 44 and 50, and the individual line terminals 6. The circuit connection from upper line terminal 6 is described for purposes of reference. Thus the uppermost line terminal 6 in FIG. 4 is connected directly via the lead 25 to the one side of the coil 23 of winding 18" as in FIG. 6. The opposite side of coil 23 is again connected to number 4 socket 10 of the motor part 9. The sockets 10, 11 and 12 are interconnected to each other and form a common connection. The associated coil 24 of winding 18" is connected via the lead 33 directly to the number 7 socket 10. The U-shaped shorting contact 35 connects the number 7 socket to the number 1 socket 10, which in turn is connected by lead 36 directly to the line terminal 6 for the first phase supply line. Both coils 23-24 are connected in parallel between line 1 and the common connection established by the interconnection of lines 32, 44 and 50. The phase winding 18' similarly has its coils 19 and 20 connected in parallel to the second phase lines, while the third phase winding 18' similarly has its coils 21 and 22 connected to the third phase input.

Again, in the low voltage connection, the coils are connected in parallel between the incoming power supply phase line and the common reference connection.

The high voltage connection is established by reversing the position of the movable plug 12 and aligning the "high" voltage legend with the voltage key 14 on the motor part 9.

In this position, the six U-shaped jumper leads are located to the lower 3×4 matrix portion of the 3×5 matrix of the motor mounted socket unit, as viewed in FIGS. 5, 6 or 7. In this position, the jumper contacts 27, 42, 35, 46, 48 and 49 make the following socket connection: the number 4 and 7 sockets, the number 5 and 8 sockets, the number 6 and 9 sockets, number 1 and 13 sockets, number 2 and 14 sockets, and number 3 and 15 sockets. The socket terminals 13, 14 and 15 are however open and the interconnection to the line related sockets 1, 2 and 3 are effectively superfluous. The connection does not, however, interfere with the system motor connection and is provided to permit the use of the same identical part for both the high and low voltage connections.

More particularly, in the one intermediate row, the shorting plug 12 functions to interconnect the socket terminals 4 and 7, 5 and 8, and 6 and 9 respectively. These terminals are correspondingly connected to the different ends of the paired coils of the phase windings 18, 18' and 18". The circuit connection provides a series connection of such coils between the line terminal 6 and the common lead 32, 44 and 50. Thus, the line terminal 6 is connected directly via lead 25 to the one side of coil 23. The other side is connected via the lead 26 to the number 4 socket which is connected to number 7 socket. A lead 33 connects the number 7 socket 10 to the one side of coil 24, the other side of which is connected via lead 32 to the common of the thermal overload device. The overload device is also connected via a lead to the number 10 socket, which however is open in the high voltage connection and consequently again is ineffective with respect to the circuit connection.

If the thermal overload is removed, the overload connection may be directly terminated to the number 10, 11 and 12 sockets with the socket terminals in turn interconnected permanently by a fixed wiring to provide a common circuit connection of the corresponding ends of the three windings 18, 18' and 18" to define the circuit common.

The phase windings 18 and 18' are similarly connected with the respective coils 19, 20 and 21 and 22 connected in series between the corresponding line terminals 6 and the common connection provided by the thermal overload protector.

Thus, in high voltage circuit connections established by merely reversing the movable plug 9, the coils are connected in series, in contrast to the parallel connection established for the low voltage circuit.

If the thermal overload protector is eliminated, the circuit connections and terminations are essentially identically maintained except with the removal of the thermal overload device lead 24, 34 and 37 and the interconnection of such leads directly or through shorting at the socket unit 9.

Figure 9:
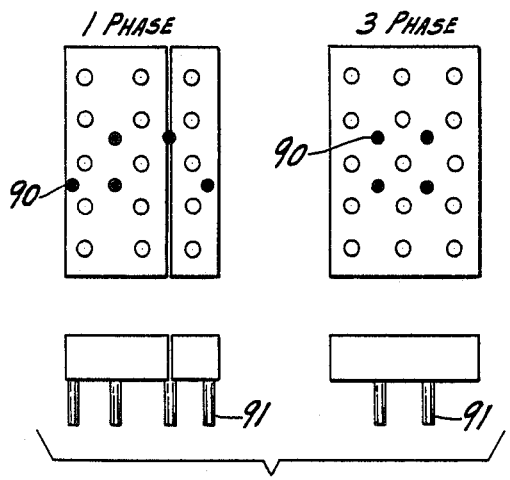
FIG. 9 is a diagrammatic view of the connector unit illustrating additional insertion control elements.

It will be noted that certain of the socket and plug terminals are not necessary in connection for the three phase motor as described. The motor part 9 of the connector assembly or unit 7 is specially constructed, however, to permit universal application in connection with various motor constructions so as to minimize the manufacturing complexity and expense. Thus, the identical connector socket unit, and a removable plug unit, appropriately modified, permit application to single phase motor, for example, as shown in FIGS. 8 and 9. As applied to a single phase motor, the fifteen contact matrix is used for both voltage selection and for rotational selection by the division of the single plug unit 12 into a pair of separate plug components. For example, a single phase reversible motor is illustrated in FIG. 8. The motor 54 incldues a pair of main running windings 55 and 56 which are interconnected to a terminal assembly 57 mounted in the motor. The motor mounted socket part 58 is identical to that shown in the three phase embodiments, and includes the contact sockets 10 for receiving a complementary plug unit 59.

As applied to a single phase motor, the plug unit 59 is constructed as a two part member, each of which is a 1×5 matrix, as shown in FIG. 8. Thus, the two separate members may be formed by separation to use only two columns of the 3×5 matrix of the unit 58. Generally, the center column of unit 58 is conveniently closed by suitable plug members, leaving the two outer columns with the corresponding 1×5 matrix for proper circuit motor connections. The first column is shown for effecting rotational control, while the third column is shown for voltage reversal control. As shown in FIG. 8, the plug unit is of the same configuration as the socket unit and covers the socket unit in the assembled position.

The illustrated embodiment of the present invention may be used for other well-known single phase motors, including permanent split capacitor motors, capacitorless split phase motors, capacitor start motors, capacitor start induction run motors as well as any other single phase motor without the auxiliary winding. The latter motors are generally fixed rotation and single voltage design, but dual voltage design is at times desired.

The illustrated single phase motor is a capacitor-start motor and has a starting capacitor 62 connected in series with a speed responsive cut-out switch 63 and a start winding 64 for connection into circuit with the main run windings 55-56 during the initial starting of the motor 55. An optional running capacitor 65 is shown, in phantom, connected directly in parallel with the start capacitor 62 and the cut-out switch 63 to illustrate an optional run mode in which the start winding remains in circuit during the run mode and after the opening of the switch 63 to disconnect the start capacitor.

The illustrated motor is typical of a single phase alternating current capacitor start motor, with an optional run capacitor. Such motors are well known in the prior art and will be readily understood by those skilled in the art. The illustrated embodiment of the present invention may be used for other well known single phase motors including permanent split capacitor motors, capacitorless split phase motors, capacitor start motors, capacitor start induction run motors as well as any other single phase motors without the auxiliary winding. The latter motors are generally of fixed rotation and single voltage design, but dual voltage is at times desired. No further description of the single phase motor is therefore given other than its connection into an operating circuit using the unique releasable connector assembly 57 of the present invention.

More particularly, single phase incoming power lines are connected to first and second line terminals 60a-60b.

The one line terminal 60a is internally connected directly to the thermal connector 66 via a termination lead 67. The thermal protector 66 in turn has a pair of additional internal connections, one of which is connected via lead 67a to the number 12 socket 10 of the socket unit 58, for subsequent circuit interconnection via the plug unit 59. The third terminal of the protector 66 is connected to one side of the motor winding 55 via lead 68a. The opposite side of motor winding 55 is connected to the number 9 socket 10 of the unit 58 via a lead 69.

The second run winding 56 of motor 54 has its one side connected directly to the second line terminal 60b on the circuit board 61. The same line terminal 60b is further interconnected via leads 70 and 71 to the number 1 and number 3 sockets 10. The opposite side of the motor winding 56 is connected via leads 72 and 73 to the number 4 and number 6 sockets. The series branch circuit for start winding 64 has one side connected by lead 74 to the number 7 socket and the opposite side connected to number 10 and 13 sockets 10 by leads 75-76. The plug-in unit 59, as previously noted, is divided into a voltage selection member 77 and a rotational selection member 78. Each of the members includes a 1×5 matrix of pin locations for supporting of contact pins interconnected by appropriate jumper leads.

For the illustrated motor 54, the voltage plug member 77 includes first and second jumper leads 79 and 80 connecting the four adjacent contact locations, while leaving the fifth pin location open or blank. The center column portion which is completely open or blank in fact may be formed as a solid body member. The rotational member 78 includes a 1×5 matrix for coupling to the first column of the socket unit 58, which controls the rotation in the illustrated embodiment and first and second jumper leads 81-82 similarly are oriented as the voltage unit 77 to couple four adjacent sockets in the column, while leaving the end sockets open. Thus the upper two pins are shown interconnected in immediately by the one jumper lead and the immediately adjacent two sockets are connected by a second jumper lead. The bottom socket, as shown in FIG. 8 is open.

The rotational plug member is provided with the appropriate counterclockwise (CCW) and clockwise (CW) rotation indicia 84 and 85 on the opposite ends thereof. The location of the rotational plug member is in relationsip to the rotational key 15, or ledge, shown on the socket element 58 in FIG. 8.

With the motor circuit connections as described, the introduction of the plug member 78 for counterclockwise rotation establishes the following circuit connections. Numbers 1 and 4 sockets 10 are interconnected by the lower jumper lead 82 of FIG. 8. The jumper lead 82 provided a circuit interconnection of the incoming line 60b to a common connection between the start circuit via lead 74 for start winding 64 and the one run winding 56 which is connected directly to terminal 60b. In addition, the uppermost plug jumper contact 81 interconnects numbers 4 and 10 sockets 10, thereby interconnecting the opposite side of the start circuit via leads 75 and 72 to the opposite side of the same run winding 56. This establishes an initial parallel circuit connection of the start winding 64 relative to the run windings 56, and thus also winding 55, to affect a counterclockwise rotation upon application of voltage to the motor.

The completion of the motor circuit is through the voltage connection established by the voltage plug member 77.

The upper jumper lead 79 of the voltage plug member 77, when arranged for the low voltage connection in FIG. 8, interconnects the number 6 and 12 sockets 10. This establishes a circuit connection between the run winding 56 to the line terminal 60a, and the opposite side of winding 56 is connected directly to the other power like terminal 60a.

The second plug jumper lead 80 connects socket number 3 and 9 of sockets 10. This in turn affects the interconnection of the second motor winding 55 to the second line terminal 60b and thereby connects the motor winding 55 between line 60b and the one side of the thermal protector 66, the opposite of which is connected to terminal 60a by the lead 67.

In summary, the top side of the windings 55 and 56 are connected via protector 66 in common to terminal 60a. The bottom side of the winding 56 is connected directly and the corresponding side of winding 55 is connected by the jumper lead in common to the line terminal 60b.

The start winding branch circuit is in turn connected in parallel with both windings 55 and 56 by the direction of plug member 78, thereby providing a conventional parallel circuit connection of all three windings during starting of the motor for the low voltage connection. The motor thus operates at the lower voltage and in a counterclockwise rotation.

Reversal of the directional plug 78 reverses the position of the shorting contacts 80 and 81 to now interconnect the number 1 and 13 sockets 10 and the number 4 and 7 sockets, respectively. This reversal of the circuit connection reverses the interconnection of the start winding with respect to the main windings 55-56. In particular, the branch circuit of start winding 64 is connected by lead 76 and the jumped numbers 1 and 13 sockets to lead 71 which is connected to line terminal 60b. The opposite side of the series circuit is connected via the interconnection to the number 7 socket which is connected by jumper contact to number 4 socket 10, which is connected by lead 72 of the winding 56. This reverses the orientation of the current through the start winding 64 relative to the run winding 56 and results in an opposite rotation of the motor which will be maintained even after the start winding is disconnected.

Reversal of the voltage plug 77 again reverses the interconnection of the socket terminals in the third column of the socket matrix. In this instance, socket 12 is now open, while number 6 and 9 sockets 10 are interconnected by jumper lead 80, and number 3 and 15 sockets are interconnected by jumper lead 79. In this opposite connection, however, the number 3 socket connection to number 15 socket is an open socket. It merely provides for the use of the jumper plug without affecting the circuit connection. Number 6 and 9 sockets 10 which are interconnected provide for interconnection of the top side of the winding 56 to the lower side of the winding 55 and thus provides for a series connection of such windings. The circuit is thus established between lines 60a and 60b including a series run circuit, including the thermal overload protector 66 to the illustrated top side of the winding 55.

The directional selection is maintained for either counterclockwise or clockwise rotation in the identical circuit connections previously described.

The 3×5 contact matrix on the motor mounted unit allows the use of the identical connector arrangements without the requirement for unique constructions for each motor type. Even for interchange between a three pahse and a single phase, the plug unit is basically the same, merely requiring the separate individual voltage member and rotational member for interconnection to the motor-mounted part.

With the protector removed, the plug jumper lead connections remain the same and the socket connections remain the same except for internal circuit connections revised to remove protector 66 and directly connect line terminal 60a to the top side of the winding 55 internally of the motor and also connecting the line terminal 60a to number 12 socket 10 of the socket unit 58. Thus, the single internal connection revision is made. The circuit connections remain the same except that the line terminal 60a now connects directly into the run winding 55 without interconnection of the thermal protector 66 into the circuit.

In addition to the visual keying, polarizing of the plug-in type connectors is preferably provided to further insure proper insertion. For example, keying recesses and pins may be provided throughout the respective socket member 58 and the related plug members 77-78 to insure the controlled interconnection of the units.

As shown in FIG. 9, the socket member 12 and 58 have three staggered pin openings 90. The differential spacing is interrelated to pins 91 and the plug-in members 9 and 59 to restrict the insertion of the plug-in member for limiting the connections to a available voltage and/or rotational connection.

Figure 10:
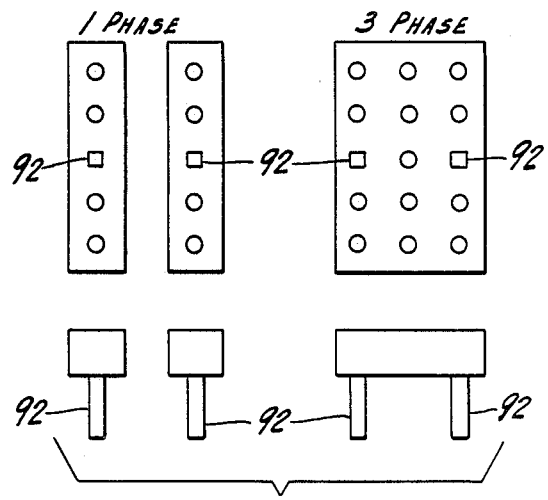
FIG. 10 is a view similar to FIG. 9 illustrating an alternate control element.

A keying system having selected internal pins and socket locations of unique cross-sectional configuration or the like can be used. Thus, as illustrated in FIG. 10, square sockets 92 in the socket members 12 and 58 restricts insertion of the plug members 9 and 59 with corresponding square pins aligned with the square sockets. The construction of special contact elements would generally be an additional cost factor. The molded parts may be readily formed with the appropriate keying structure at no or at most minimal cost.

In the illustrated system, as applied for a three phase system, only four rows of the contact locations in the plug-in unit are used. The plug-in unit may therefore be formed as a 3×4 matrix unit. Thus would of course require that the plug when inserted be properly positioned to the socket member. Polarization of the plug and socket can insure that only the two proper insertions are possible.

In summary, the motor-mounted connector part with the 3×5 socket arrangement and the appropriate plug unit provides for implementation of various variations for application to both single phase motors and three phase motors.

The present invention thus provides a significant advance over the conventional strip leads, flags, tabs and line connection systems currently in use as well as the various other plug-in type units have been suggested, in providing a universal connector apparatus for use with widely differing motor types.

The unit can be readily constructed using readily available standard components. For example, the socket contacts are commerically available from Amp, Inc., under the part number 350537-1. The shunt terminal pins and plug elements can be ordered from MEMC Model 102135. The 3×5 socket matrix is commercially available under part number 102134 from MEMC. Although the connector is shown mounted within the end motor cavity, the assembly may obviously be otherwise located such as in a conventional motor conduit box secured to the side of the motor, a remotely located junction box or in any other desired location, where the end user has ready access to the unit to provide the appropriate insertion of the plug. The connector assembly is preferably located adjacent to the motor, whenever the user makes the field terminations so that the user's attention is brought to the motor select device and that the selection must be made to effect the desired circuit connection.

The present invention thus provides a simple, reliable and low cost connector assembly for significantly reducing the complexity of motor circuit connection selection while correspondingly permitting cost efficient manufacturing cost.

Various modes of carrying out the invention are contemplated as being within the scope of the following claims particularly pointing out and distinctly claiming the subject matter which is regarded as the invention.

I claim:

1. A universal releasable motor connector apparatus for interconnecting of a multiple winding motor to incoming supply lines and adapted for connecting of different motor circuits, comprising a support means, a first fixed connector part having a 3×5 matrix of available contact locations, said fixed connector part having a single piece body unit and fixed contact means at selected of said available contact locations, separate line terminals separate from said 3×5 matrix of contact locations for connection to incoming power supply lines, mounting means for mounting said motor mounted part to said support means, said fixed contact means having means for termination to the windings of the motor and to said line terminals to establish different motor operating states, a movable shorting part having a single piece body unit and a 3×5 matrix of available contact locations, a plurality of shorting contact means in said available contact locations of said movable shorting part, each said shorting contact means spanning two of said fixed contact means for providing a shorted interconnection of said fixed contact means, said movable shorting part adapted to be coupled to said motor mounted part in a plurality of different orientations and each orientation establishing interconnection of different fixed contact means and thereby changing the interconnection of the motor windings for selective different motor operations.

2. A releasable connector unit for connection of a load to incoming supply lines, comprising incoming power supply terminals, a fixed connector part having a rectangular matrix of 3×5 available contact locations, a support mounting means adapted to mount said fixed connector part to said support, said fixed connector part having contact means in a 3×4 matrix of said 3×5 matrix of available contact locations, means connecting said contact means to said load and to said incoming power supply terminals, a movable part having an outer configuration corresponding to the fixed connector part and having a plurality of available contact locations arranged in a 3×5 matrix complementing said matrix of said fixed connector part, shorting conductors spanning two adjacent contact locations of said available contact locations of said movable part and defining a 3×4 matrix of said shorting conductors, said movable part adapted to be coupled to said fixed part in a first aligned orientation and a second orientation rotated 180 degrees from said first orientation, each of said orientations establishing shorted interconnection of fixed contact means of said fixed connector part, and said first orientation establishing interconnection of said fixed contact means for a first load voltage connection and said second orientation establishing interconnection of said fixed contact means for a second load voltage connection.

3. The apparatus of claim 1 wherein said movable part includes a 3×4 matrix of available contact locations responding to the 3×4 matrix within the 3×5 matrix of the first connector part, said 3×4 matrix of said movable part including shorting contact means.

4. A universal releasable motor connector apparatus for interconnecting of a multiple winding motor to incoming supply lines and adapted to connection to different motor circuit configurations, comprising a support means, a first fixed connector part having a 3×5 matrix of available contact locations, said fixed connector part having a single piece body unit and fixed contact means at selected said available contact locations, separate line terminals separate from said 3×5 matrix of contact locations for connection to incoming power supply lines, mounting means for mounting said motor mounted part to said support means, said fixed contact means having means for termination to the windings of the motor and to said line terminals to establish different motor operating states, a movable shorting part having a plurality of shorting contact means in said available contact locations of said movable shorting part, each said shorting contact means spanning at least two of said fixed contact means for providing a shorted interconnection of said fixed contact means, said movable shorting part adapted to be coupled to said motor mounted part in a plurality of different orientations and each orientation establishing interconnection of different fixed contact means and thereby changing the interconnection of the motor windings for selective different motor operations, said movable shorting part includes a first element and a second element, said first fixed connector part having a first 1×5 matrix of available contact locations of said 3×5 matrix establishing a voltage connection and a second 1×5 matrix of said 3×5 matrix establishing a rotational connection, said first element having a 2×5 matrix of available contact locations establishing a rotation selection, said first element having a 1×5 matrix of available contact locations for voltage selection and said second element having a 1×5 matrix of available contact locations for rotational selection, said fixed contact means being connected and arranged to establish corresponding voltage operation and rotational operation in accordance with the orientation of said first and second elements.

5. The apparatus of claim 1 wherein said first connector part and said movable part have identifying key means for identifying the established circuit connection.

6. The motor connector apparatus of claim 1 wherein said first connector part and said movable part have interrelated key means restricting the connection of said movable part in said preselected orientations.

7. A releasable connector unit for interconnecting of a multiple winding motor to incoming supply lines and adapted to connection to different motor circuit configurations, comprising a fixed connector socket member having a selected matrix of 15 available contact locations, mounting means adapted to mount said socket member to a fixed support, said socket member having contact sockets at preselected of said 15 available contact locations for termination to the windings of the motor, separate line terminal means for connection to incoming line terminals providing power supply connections to said motor windings, a movable plug member having a plurality of generally shorting conductors defining contact pins in a matrix corresponding to said selected matrix of socket members and spanning two of said terminal contact locations for providing a shorter interconnection of said socket members and said fixed contact means, said movable plug member adapted to be coupled to said socket member in a plurality of different orientations, and each orientation establishing interconnection of different socket members and thereby changing the interconnection of the motor windings to each other and to said incoming line terminals for selective different motor operation.

8. The apparatus of claim 7 wherein said selected matrix of said fixed connector socket member has a 3×5 matrix and said movable plug member is a single member and including a 1×5 matrix for each column of said 3×5 matrix having operative contacts.

9. The apparatus of claim 7 wherein said movable plug member is a single member and includes a 3×5 matrix of available contact locations and having contact pins in a 3×4 matrix within the 3×5 matrix.

10. The motor connector apparatus of claim 7 wherein said fixed connector socket member having a first 1×4 matrix portion of said selected matrix having fixed contact means establishing a voltage connection and a second 1×5 matrix of said selected matrix having contact means establishing a rotational connection, said movable plug member includes two separate elements including a first element having a 1×5 matrix voltage selections and a second element having a 1×5 matrix rotational selection.

11. The apparatus of claim 7 wherein said fixed connector socket member and said movable part have identifying means for identifying the established circuit connection.

12. The motor connector apparatus of claim 7 wherein said fixed connector socket member and said movable plug member have interrelated key means restricting the connection of said movable plug member in said preselected orientations.

13. A multiple winding connector apparatus for interconnecting of a plurality of winding coils of AC motors to incoming power supply lines, said motors having different voltages and rotational directions, comprising a circuit board adapted to be fixedly mounted to said motor, incoming power line terminals secured to said circuit board, a first multiple contact connector part secured to said circuit board and defining a motor mounted part, said connector part having an insulating body having a 3×5 matrix of available contact locations arranged in a three parallel spaced columns and five parallel spaced rows, selected ones of said contact locations having contact members with terminal portions, means interconnecting said line terminals to said windings and to selected ones of said terminal portions, said contact means having external means in said 3×5 matrix adapted to releasably engage complementing contact members, a movable connector part including an insulating body adapted to be releasably secured to said insulating body of said motor mounted part, said movable insulating body of said movable part including a 3×5 matrix of contact locations, said selected locations adapted to receive one of said complementing contact members, said complementing contact members being provided at preselected locations in accordance with preselected motor winding connections, jumper conductors within said movable insulating body of said movable part interconnecting adjacent complementing contacts to define interconnecting contact connecting pairs, means for interconnecting of said movable insulating body to said fixed insulating body in at least two preselected different orientations with said contact locations aligned with said movable parts establishing a first motor operation in said first orientation and a second motor circuit connection and operation in said second orientation.

14. The connector apparatus of claim 13 wherein said fixed insulating plug is a rectangular block member having a flat planar face, said contacts and said complementing contacts consisting of releasably interengaging sockets and pins, corresponding contact sockets being provided in one of said parts in corresponding complementing pins being provided in the other of said fixed and movable parts, and interconnecting of contacts present in said locations, identifying means on said motor mounted insulating part and on said movable insulating part for identifying circuit connections established by each orientation.

15. The connector apparatus of claim 13 wherein said movable part includes a base member and a cup member secured to said base member, and contacts within said base member, said contacts having connective means to interconnect adjacent contacts on a planar surface, and defining a complementing contacts, said cup member locking said contacts in place.

16. The connector apparatus of claim 13 wherein said movable part includes a base member and a cup member secured to said base member, and contacts within said base member and defining said complementing contacts, said cup member locking said contacts in place, the contacts may be U-shaped or any shape which can connect two positions on a planar surface.

17. The multiple winding connector apparatus of claim 13 wherein said first multiple contact connector part includes a rectangular block body of insulating material and said contacts are socket members adapted to releasably engage complementing contact pins, said movable connector including a rectangular block-like body including U-shaped pin members defining complementing contact pins and said preselected different orientations being defined by the two 180 degree orientation of said movable part.

18. The unit of claim 2 wherein said fixed part has an end portion defining a keying means, and said movable part having an offset lower end portions constructed and arranged whereby said offset lower end is aligned with said end portion of said fixed part with said movable part orientation for a low voltage connection.

19. The unit of claim 2 wherein said fixed connector part has a rectangular shape and said movable part has a corresonding rectangular shape.

20. The motor connector unit of claim 2 wherein said movable plug has a flat top wall and an inwardly set end wall adjacent one end of said flat top wall, an upper voltage, identifying end wall aligned with said offset wall in a first orientation establishing a low voltage connection and aligned with the opposite end of said movable part in a second orientation establishing a high voltage selection.

* * * * *

UNITED STATES PATENT AND TRADEMARK OFFICE
CERTIFICATE OF CORRECTION

PATENT NO. : 4,748,355
DATED : May 31, 1988
INVENTOR(S) : Wesley K. Anderson et al It is certified that error appears in the above-identified patent and that said Letters Patent is hereby corrected as shown below:

Col. 2, line 13, delete "lined" and substitute therefor ---lines---;

Col. 4, line 16, delete "interconnecting" and substitute therefor ---interconnection---; Col. 6, lines 67-68, delete "connection" and substitute therefore ---connected---; Col. 8, line 16, delete "the" (1st occurr.) and substitute --three--; Col. 8, line 26, delete "25" and substitute therefor ---35---; Col. 12, line 26, delete "provided" and substitute therefor ---provides---; Col. 13, line 43, delete "pahse" and substitute therefor ---phase---; Col. 14, line 16, delete "Thus" and substitute therefor ---this---.

Signed and Sealed this

Twenty-fifth Day of July, 1989

Attest:

DONALD J. QUIGG

*Attesting Officer*  *Commissioner of Patents and Trademarks*